March 19, 1968  L. LAKE ET AL  3,373,628
HAND CONTROL FOR MOTOR VEHICLES
Filed April 1, 1965  4 Sheets-Sheet 1

INVENTORS
LOUISE LAKE
GEORGE H. MORTIMER

March 19, 1968  L. LAKE ET AL  3,373,628
HAND CONTROL FOR MOTOR VEHICLES
Filed April 1, 1965  4 Sheets-Sheet 2
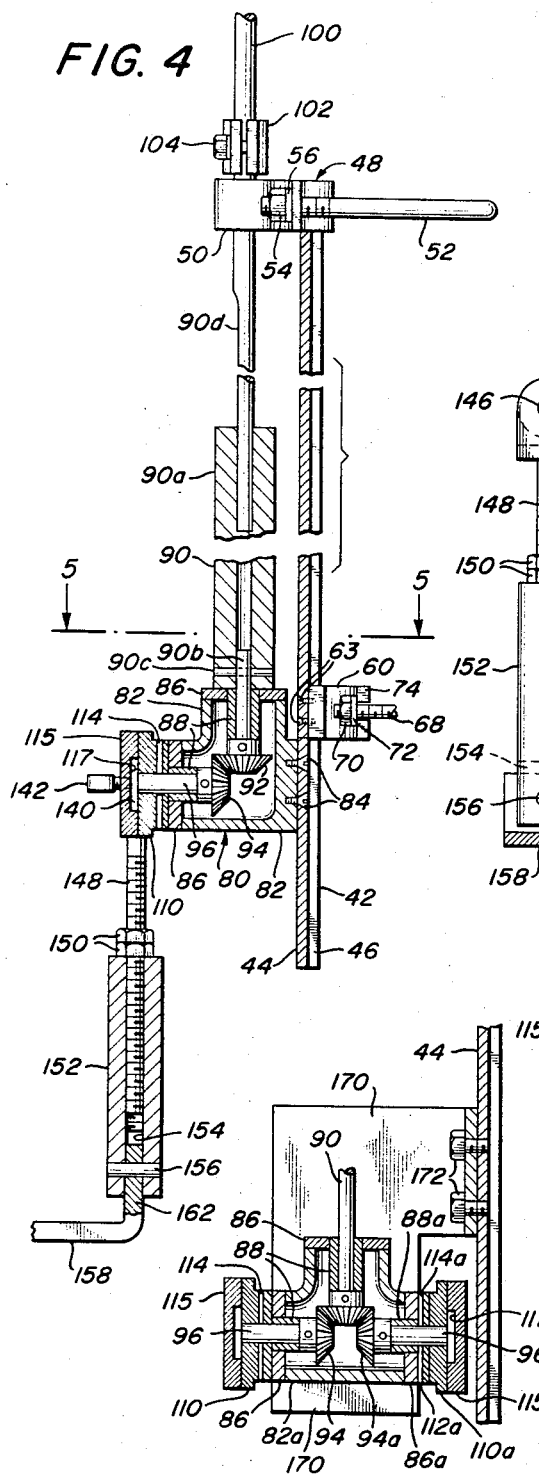
INVENTORS
LOUISE LAKE
GEORGE H. MORTIMER March 19, 1968 L. LAKE ET AL 3,373,628
HAND CONTROL FOR MOTOR VEHICLES
Filed April 1, 1965 4 Sheets-Sheet 3

INVENTORS
LOUISE LAKE
GEORGE H. MORTIMER

March 19, 1968  L. LAKE ET AL  3,373,628
HAND CONTROL FOR MOTOR VEHICLES
Filed April 1, 1965  4 Sheets-Sheet 4
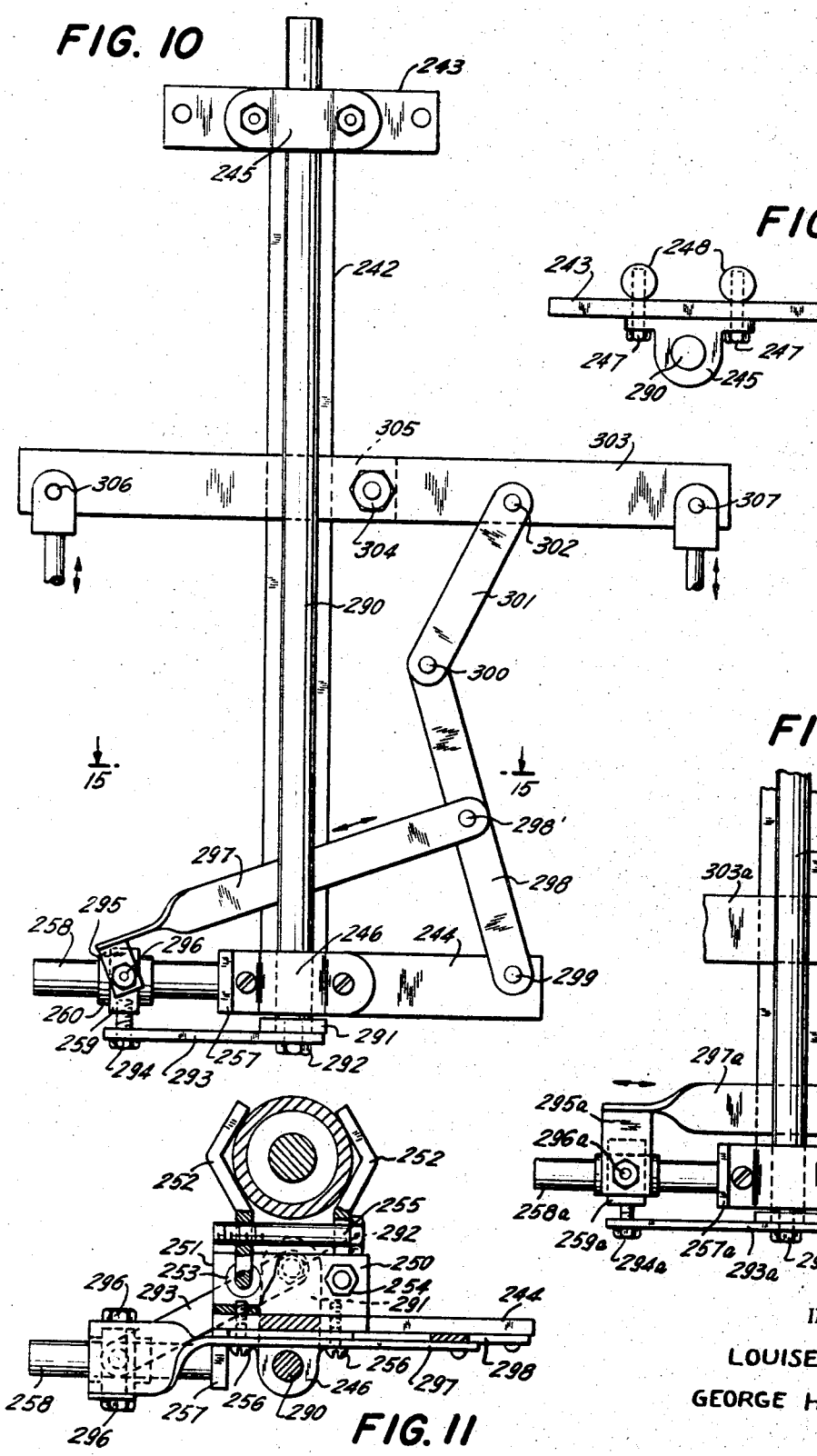
INVENTORS
LOUISE LAKE
GEORGE H. MORTIMER United States Patent Office 3,373,628
Patented Mar. 19, 1968

3,373,628
HAND CONTROL FOR MOTOR VEHICLES
Louise Lake, New York, N.Y., and George H. Mortimer, Montclair, N.J., assignors, by mesne assignments, to Louise Lake Enterprises, Inc., Mount Kisko, N.Y., a corporation of New York
Filed Apr. 1, 1965, Ser. No. 444,650
16 Claims. (Cl. 74—484)

The present invention relates to a hand control for motor vehicles which is particularly adapted to meet the needs of handicapped persons who do not have the use of their lower limbs and thus cannot operate the conventional foot controls. Since the majority of the automobiles in use today have automatic gear shifts and therefore do not have a floor clutch pedal, the present invention provides means for operating by hand the brake, the dimmer switch and the accelerator.

Many hand controls have been the subject of patents and some hand controls are available on the market. All of these prior devices suffer from one or more of the following disadvantages:

They require one hand of the operator to be taken from the steering wheel all the time the hand control is being used.

They are difficult and time consuming to install. They are not applicable to a large number of different makes and models of automobiles.

The present invention overcomes these disadvantages. The structure and principle of the invention, the manner of using it and the best mode of carrying out the invention in a number of embodiments thereof will be described in conjunction with the drawings in which:

FIG. 3 is a partial elevational view, with some parts in section, of the lower part of the control of FIG. 1;

FIG. 4 is a fragmentary vertical sectional view generally along the line 4—4 of FIG. 2;

FIG. 5 is a fragmentary cross sectional view along the line 5—5 of FIG. 4;

FIG. 6 is a fragmentary sectional view of a different embodiment of part of the device of FIG. 4 which adapts it for right and left hand operation on movement of the control lever in either direction;

FIGS. 10, 11 and 12 are front, sectional along the line 15—15 and top views, respectively, of another embodiment of the hand control of the invention; and FIG. 13 is a fargmentary front view of a modification of the hand control of FIG. 10.

Figure 1:
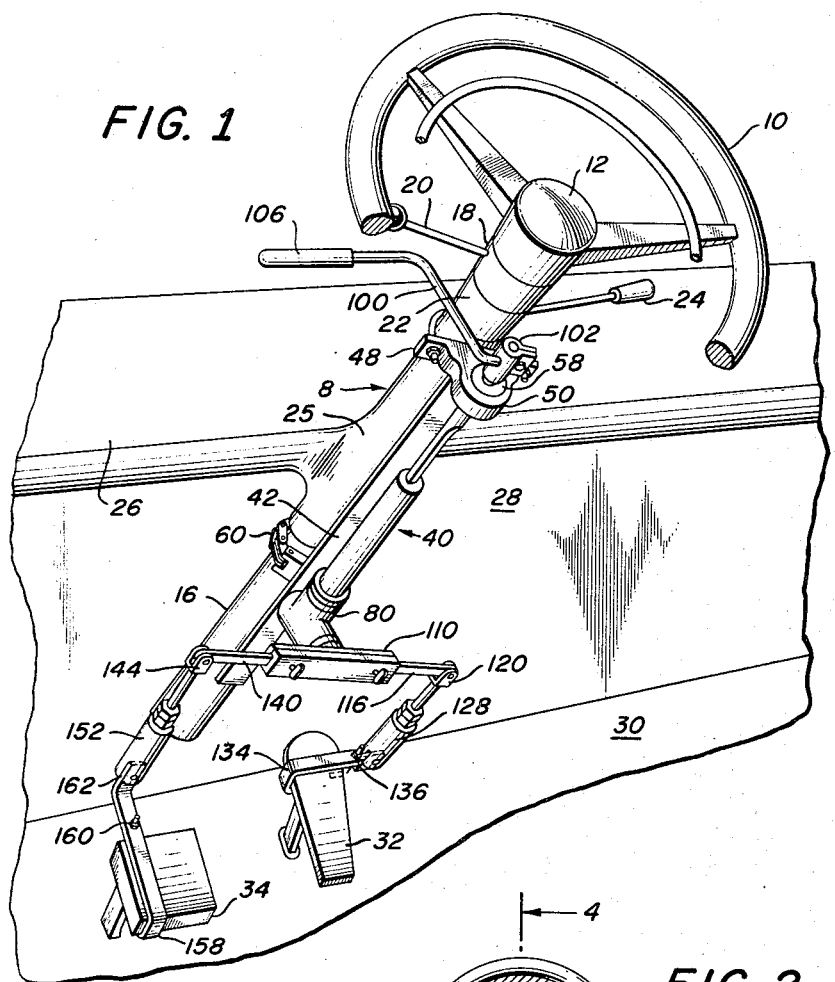
FIG. 1 is a perspective view of one embodiment of the invention applied to the steering column, brake and accelerator of an automobile.
Figure 2:
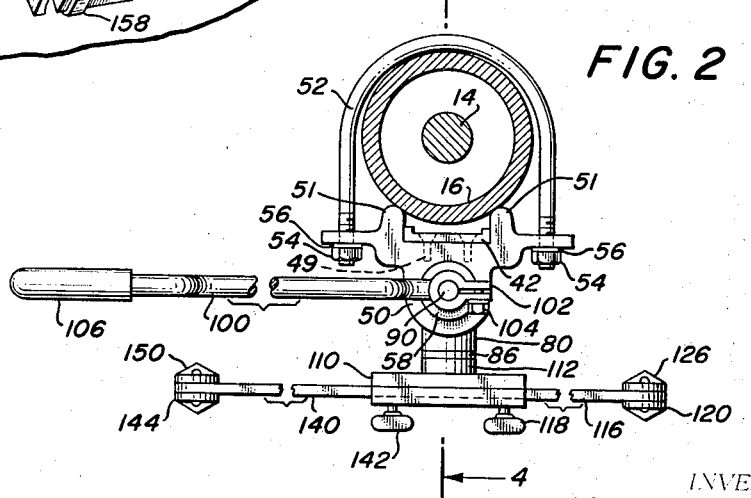
FIG. 2 is a top view of the device of FIG. 1 without the clamps for the brake and accelerator with the steering column shown in cross section.
Figure 7:
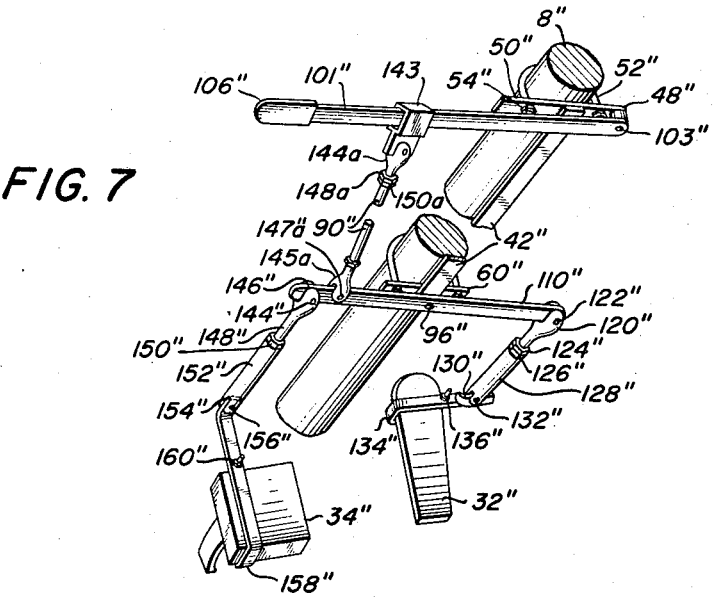
FIG. 7 is a fragmentary perspective view of a different embodiment of the hand control of the invention.

Referring first to FIG. 1 parts of a conventional motor vehicle are fragmentarily shown comprising a steering column 8, a steering wheel 10 having a hub 12 non-rotatably secured to the upper end of a steering rod 14 rotatably mounted in a fixed housing 16. Most automobiles now in use have, just below the mounting of the steering wheel on the upper end of the housing, a fixed collar 18 provided with a hole through which a directional signal lever 20 passes outwardly to the left and a movable collar 22 just below the fixed collar on which a gear shift lever 24 is mounted. The steering column is suitably mounted in position in the automobile, e.g., by a steering column bracket 25 secured to the dash board 26 and by some connection to a fire wall 28 or floorboard 30. An accelerator pedal 32 and brake pedal 34 are illustrated as having connections through the floorboard 30 to the carburetor and brake mechanism (not shown) but it will be understood that the particular type of connection or brake system is not part of the invention and that these parts have been illustrated as environment in which the invention may be used and to show how it may be secured removably to the motor vehicle. Similar parts are shown in FIG. 7 by a double prime (″).

The hand control unit is designated generally by numeral 40. It comprises a frame adapted to be removably mounted on the housing of the steering column by clamping means. The frame may take any desired form but in the device illustrated it is a frame piece 42, e.g., a channel iron having a web 44 and flanges 46. The clamping means is illustrated as having an upper clamp 48 secured to the upper end of 42 by any suitable means, e.g., fasteners 49. The upper clamp as illustrated includes a block 50 having two spaced projections 51 adapted to engage the housing 16 and provide a three point contact with U-bolt 52 when pulled tightly against the housing by nuts 54. Washers 56 are preferably interposed between the nut 54 and the block 50 and they may be lock washers to keep the nuts 54 tight despite vibration. It will be seen that this upper clamp is adapted to secure the unit to the housings of steering columns which have widely varying diameters. Mounted in block 50 is a bearing 58 which forms the fulcrum for a control lever later to be described.

A lower clamp 60 is provided on the frame 42 so that the frame is secured on and along the steering column housing 16. Since the diameters of the housings of different automobiles vary considerably the lower clamp is made adjustable as to diameter of grip. One convenient form of clamp for housings that permit the clamp to encircle it may comprise a V-bar 62 secured to web 44 by bolts 63. Such a clamp and connection can be made adjustable up and down the frame piece 42 by the mere expedient of providing a plurality of holes at different positions along the web 44. As shown best in FIG. 5 a chain 64 is pivoted at one end to one arm of V-bar 60 by a pivot 66. The other end of the chain is provided with a bolt 68, a nut 70 and a washer 72 which enable the chain to be pulled tight against the housing 16 when the bolt is slipped into the slot provided in the bifurcated end 74 of V-bar 62 as seen in FIGS. 4 and 5.

Also secured to the frame 42 is motion translating device 80 which in this embodiment is a bevel gear box comprising a housing 82, fasteners such as bolts 84 to fasten it to the frame, end plates 86 secured to the housing 82 in which bearings 88 are held, a drive shaft 90 having a bevel gear 92 non-rotatably secured to the lower end thereof, and a driven shaft 96 having a bevel gear 94 non-rotatably secured to the inner end thereof in mesh with gear 92. The drive shaft may be made adjustable in length to make the manual control applicable to automobiles of varying dimensions from steering wheel to brake pedal and accelerator pedal and to housings having different designs and dimensions. As illustrated the drive shaft 90 comprises a tubular section 90a secured to a stub shaft 90b by a pin 90c. The bore through tubular section 90a is preferably non-circular, e.g., flattened at one side as shown in FIG. 5 to receive a similarly shaped non-circular end of a rod 90d journaled in bearing 58 and extending beyond it. It will be understood that the motion translating device 80 can be placed at any desired position along the frame by the mere expedient of providing a plurality of holes along the web 44 for the bolts 84, as previously described for clamp 60 adjacent to which the box 80 is preferably located.

An operating lever 100 is fastened to the end of drive shaft 90 which extends above bearing 58. A preferred means for securing the lever 100 to the shaft 90 permits the lever to be angularly adjusted relative to the shaft so that it can be turned for right hand or left hand operation easily and yet be non-rotatably held for operation. In the embodiment shown the lever is welded or otherwise secured to a collar grip 102 having a bolt 104 for tightening the grip fixedly on the end of the drive shaft 90. As those skilled in the art know, knurling, flutes, or the like may be provided if desired to be certain no relative movement of the grip relative to the shaft 90 occurs after bolt 104 is tightened. At the end of the lever remote from the collar grip 104 a handle 106 is provided. In this embodiment of the invention it will be seen that the handle is adapted to be positioned adjacent to the under surface of the steering wheel and to move substantially parallel thereto. Generally this means that the handle will be curved upwardly from the collar grip so as to miss any spokes or the like connecting the rim of the steering wheel to the hub thereof as shown in FIG. 1. This enables the operator to keep the hand that operates lever 100 on the steering wheel at all times. To adapt the control for easy installation on a wide variety of makes and models, the lever is bent to the shape suited for the automobiles having the minimum distance between the fixed collar 18 and the steering wheel rim. Then for automobiles having greater distances between these parts it is only necessary to extend the drive shaft upwardly from bearing 58 far enough to compensate for the difference. The shaft can be held by collars or like means. The bearing 58 serves as the fulcrum for lever 100 which is adapted to impart oscillations to the drive shaft 90 about a vertical axis. Where the term "vertical" is used herein it is to be understood to refer to the up and down direction along the housing of the steering column which is vertical as seen along the axis from front to back of the motor vehicle but at somewhat of a slope as seen from the side of the same. Similarly the term "horizontal" is to be understood to be substantially at right angles to the "vertical" as used herein.

The stub shaft 96 serves as the fulcrum for a control bar that extends transversely of the vehicle so as to overlie, or at least come in the vicinity of, both the brake pedal and the accelerator pedal. The shaft 96, and therefore the fulcrum, lies generally parallel to the axis of the vehicle so that the transversely extending bar has an up and down motion at both sides of the fulcrum in relation to the brake pedal and accelerator pedal. It is advantageous in many cases to make the control bar adjustable in length to adapt it for different makes and models of automobiles. In the embodiment shown in FIGS. 1 to 6 the bar comprises a T-bar 110 having a collar 112 fastened to shaft 96 by a pin 114 at one side of the bar and a channel cover 115 at the other side fastened thereto to receive, at one end, an actuator arm 116 in the slot 117 formed by the cover. See FIG. 4. Locking means, e.g., a thumb screw 118 holds arm 116 to bar 110 is any desired position of lengthwise adjustment. Adjacent to the other end of arm 116 a clevice 120 is pivoted thereto by a pin 122. A threaded rod 124 having lock nuts 126 thereon is secured to clevice 120. Rod 124 has slidable engagement in a tube 128 which has a slot 130 at the lower end thereof and is provided with a bore transversely with respect to the slot to receive a pivot pin 132.

Means are provided to connect the tube 128 to the accelerator 32 of the motor vehicle. A convenient means comprises a hook plate 134, a J-bolt 136 and a pivot arm 138 as seen best in FIGS. 1 and 3. The arm 138 goes in the slot 130 and has pivotal connection by the pin 132.

At the other end of bar 110 a brake arm 140 is received in slot 117 and held there by wing nut 142. The other end of arm 140 has a clevice 144 pivoted thereto by pin 146. A threaded bar 148 is secured at one end to clevice 144 and has lock nuts 150 on the threaded end. Bar 148 has slidable connection with a tube 152 having a slot 154 in the lower end thereof to receive an end 162 of a hook plate 158 to which it is pivoted by pin 156. The hook plate is adapted to be fastened to the brake 34 by any suitable means, e.g., a J-bolt 160.

It will be seen that the structure described provides a lost motion linkage or connection between the control lever 100 and the brake pedal and accelerator pedal whereby the brake pedal can be depressed when the lever is moved in one direction, the accelerator pedal can be depressed when it is moved in the other direction and each return with the normal spring provided on the automobile to its neutral position when pressure is relieved. The respective clevice and associated parts, however, can rise higher than the neutral position because of the slidable connection to the brake pedal or accelerator pedal when the other is depressed, thus assuring trouble free alternative or selective operation of brake pedal or accelerator pedal as needed in the driving of the vehicle. The threaded rods 124 and 148 with their respective lock nuts 126 and 150 make possible a certain amount of vertical adjustment to adapt the device to different makes and models of automobiles without moving the device 80 along the frame. The only requirement is that the bar 124 project an inch or so into the tube 128 when the brake pedal is fully applied and vice versa that bar 148 projects into tube 152 an inch or so when the accelerator pedal is fully depressed. The lock nuts also permit accurate adjustment so that each just engages its respective tube in the neutral position of both the brake pedal and the accelerator pedal.

With the operating lever at the left as shown in FIG. 1, movement upwardly, i.e., away from the operator, depresses the brake pedal while movement toward the operator operates the accelerator pedal. By loosening the bolt 104 the lever can be moved to the right side and then fastened there for right hand operation. In this case the brake pedal is applied by movement toward the operator and the accelerator pedal by movement upwardly or away from the operator. Different drivers may have different preferences for the direction of applying the brake and for either right or left hand operation and this is provided in the embodiment of FIG. 6.

In the device of FIG. 6 a second stub shaft 96a and associated bevel gear 94a are provided in a modified housing 82a which has an end plate 86a opposite the end plate 86 for stub shaft 96 and end plate 86a carries a bearing 88a for the shaft 96a. A T-bar 110a having a collar 112a is fastened to shaft 96a by a pin 114a. It also has a cover 115a to provide a slot 117a for accelerator arm 116 and brake arm 140. It will be seen that bars 110 and 110a oscillate in opposite directions so that lever 100 can operate the brake pedal in either direction from right or left side by putting arm 140 in the proper slot and likewise the accelerator pedal can be operated in either direction by putting in the proper slot the arm 116. In this embodiment it is necessary to fasten box 82a to the frame by means other than a direct bolting thereof to the web 44 used in FIG. 4 and a convenient means comprises a bracket 170 secured to the side of the box with an arm above the box extending to the web 44 to which it is fastened by bolts 172. This device can also be adjusted up and down the frame by the mere expedient of providing a plurality of holes for bolts 172.

The embodiment of FIG. 7 includes a frame 42″, an upper clamp 48″ with block 50″, U-bolt 52″ and nuts 54″, a lower clamp 60″, a transverse bar 110″ and associated linkages to brake pedal 34″ and accelerator pedal 32″ substantially like the correspondingly numbered parts of the embodiment of FIGS. 1 to 5. The fulcrum 96″ for the bar 110″, like the stub shaft 96 extends generally parallel to the axis of the vehicle so that the bar 110″ may oscillate vertically around a horizontal axis. The means for oscillating the bar 110″, and thereby selectively applying the brake or operating the accelerator, comprises a lever 101″ pivoted by a shoulder bolt 103″ to block 50″ at one end and having a handle 106″ at the other end. Intermediate the ends of lever 101″ is a collar grip 143 which can be held in any desired position by a bolt or set screw. Pivoted thereto is a clevice 144a to which a threaded rod 148a is secured on which lock nuts 150a are screwed to adjust the operative length of the link between lever 101″ and lever 110″ which also includes a tube 99″ and a clevice 145a pivotally secured to lever 110″ by pin 147a.

The manner of operation of the device of FIG. 7 is apparent from the structure illustrated and described since downward pressure on handle 106″ applies the brake and upward lifting of handle 106″ depresses the accelerator pedal. The connection between rod 148a and tube 99″ is not a lost motion but fixed though adjustable connection. Moreover if the operator desires right hand instead of left hand control, it is only necessary to turn plate 50″ over so that the pivotal connection to lever 101″ is at the left instead of the right, turn the collar grip 143 over and make suitable adjustment in the length of link 99″. In case of right or left hand control the length of link 99″ can be so adjusted as to bring handle 106″ near enough to the under surface of the steering wheel that the hand may rest on the steering wheel as the lever is lifted to operate the accelerator. If necessitated by spokes or other parts on the steering wheel, the lever 101″ can be bent upwardly at the end near the handle 106″ somewhat as lever 100 is curved.

Figures 8, 9:
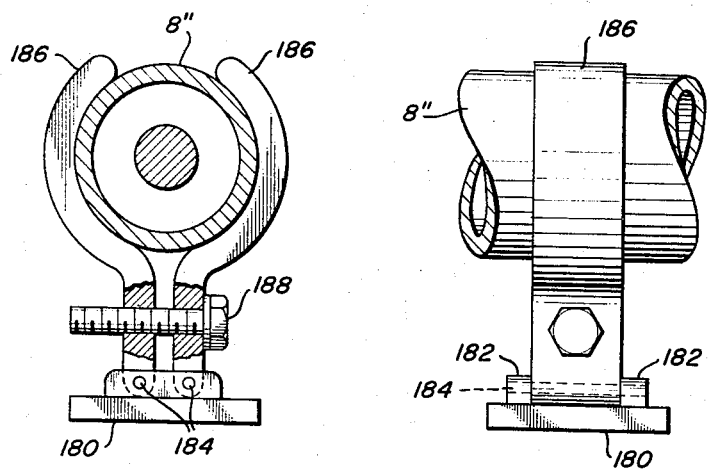
FIGS. 8 and 9 are plan and side views respectively of an embodiment of a lower clamp which may be used instead of the lower clamps shown in FIGS. 5, and 7.

The clamp shown in FIGS. 8 and 9 may be used in place of the one shown in FIGS. 5 and 7 and has the advantage that any obstructions on the upper or back side of the steering column housing as viewed from the driver's position does not prevent attachment of the device to the housing at any desired position. It comprises a base 180 having upstanding ribs or flanges 182 provided with pivot pins 184 passing through the lower ends of a pair of clamp arms 186 contoured so as partially to embrace the housing of steering column 8″. The clamping force comes from a bolt 188 threadedly engaging the one of the arms 186 remote from the head of the bolt and slidably engaging the other. Thus by tightening the bolt, as seen in FIG. 8, the left arm 186 is forced against one side of the housing while the right arm 186 is forced against the other side, thus tightening the clamp arms around the housing and gripping it between them.

Referring now to FIGS. 10, 11 and 12, the framepiece 242 in this embodiment of the invention includes a top T-piece 243 and a bottom T-piece welded or otherwise secured to the main vertical framepiece. An upper pillow block 245 is bolted or otherwise secured to the upper T-piece 243 and a lower pillow block 246 is similarly secured to the lower T-piece. As shown in FIG. 12, bolts 247 may be threaded into short rounds 248 which engage the fixed collar 18 of the steering column and with a U-bolt such as 52 form a three point contact therewith which tightly holds the upper end of the frame to the steering column. A lower clamp 250, somewhat similar to the one illustrated in FIGS. 8 and 9, is provided for the lower end of the frame. It comprises a channel piece 251 and two angled arms 252 having a length of tube 253 welded to each arm to provide with bolts 254 a pivotal connection to the webs of channel piece 251, as seen in FIG. 11. A bolt 255 threaded in one arm 252 and slidable in the other provides the clamping force against the steering column and bolts 256 secure both the lower pillow block and the clamp to the frame piece 244.

Lower T-pieces 244 is provided at the left end thereof with an arm 257 to which a round rod 258 is secured. Mounted on the rod 258 is a collar 259 and it is preferred to provide a sleeve bearing 260 for the collar to reduce friction and canting from links connected to the collar. The bearing may and preferably will be an oil impregnated sintered metal cylinder.

A drive shaft 290 is journaled in pillow blocks 245 and 246. A handle, not shown, will be non-rotatably secured to the upper end of drive shaft 290 to impart oscillations to the shaft and associated parts which include a crank arm 291 welded or otherwise non-rotatably mounted on the lower end of shaft 290, a bolt 292 securing a link 293 to an end of link 291 and a bolt 294 securing link 293 to collar 259. Thus rotation of the shaft 290 clockwise as seen in FIG. 11 slides collar 259 to the right on bar 258 while counter clockwise rotation of shaft 290 slides the collar to the left. Instead of extending from shaft 290 toward the rear, i.e., toward the steering column, as shown in FIG. 11, the crank arm 291 may extend forwardly, i.e., away from the steering column, in which case clockwise rotation of shaft 290 moves the collar to the left and counter clockwise rotation moves it to the right. Thus by the simple expedient of changing the direction of the crank arm 291 right hand or left hand operation of the hand control is achieved with gas feed being either forward or rearward movement of the operating lever and brake application rearward or forward, respectively.

A clevice 295 is pivotally secured by each of its arms to opposite sides of the collar 259 by bolts 296. A link 297 fixed at one end to the clevice 295 extends between shaft 298 and frame 242 to form a pivotal connection by a bolt 298′ to a link 298 pivoted at its lower end by a bolt 299 to the lower T-piece 244 of frame 242 and at its upper end by bolt 300 to the lower end of a link 301 which is pivoted at its upper end by bolt 302 to lever 303 is pivoted by bolt 304 to a short extension 305 on frame 242. Lever 303 is provided at its left end, as seen in FIG. 10, with a pivot hole 306 and at its right end with a pivot hole 307 for lost motion linkages to the brake and accelerator pedals similar to those used in other embodiments of the invention.

It will be observed from the drawings that links 298 and 301 form a toggle connection between the fixed pivot 299 and the movable pivot 302 on lever 303 for which bolt 304 forms the fulcrum. The toggle linkage approaches its position of maximum thrust as the moving pivot 300 moves to the right to apply the brake. When the moving pivot 300 moves to the left to apply pressure on the accelerator the pull via link 301 on the pivot 302 is also favorable mechanically since the line of force approaches the arc of movement of pivot 302.

The embodiment of FIG. 13 utilizes all of the parts of FIG. 10 from frame 242a to link 297a, which therefore need no further description except to note that the postscript "a" is added to the corresponding reference numbers of FIG. 10. Instead of lever 303 in the form of a simple bar, the lever 303a includes an arm 308 welded or otherwise secured to lever 303a just below the fulcrum 304a, thus making lever 303a a bell crank type lever. Link 297a is pivoted to arm 308 by bolt 298′a adjacent to the lower end of the arm so that motion of the collar 259a to the right applies pressure to the brake pedal and motion to the left applies pressure to the accelerator pedal.

Although the invention has been described and illustrated in connection with certain specific embodiments, those skilled in the art will recognize that many modifications and variations can be made without departing from the spirit and scope of the invention as defined in the following claims.

Having thus described and illustrated the invention, what is claimed is:

1. A manual control for operating the brake pedal and accelerator pedal of a motor vehicle having a dash board, a steering column comprising a housing fixedly secured to said dash board and a steering wheel rotatably mounted on said housing above said dash board, said control comprising:

(a) a frame adapted to be removably mounted on said vehicle adjacent to and along said housing, (b) an upper fulcrum and a lower fulcrum secured to said frame,
(c) an operating lever mounted on said upper fulcrum having a handle adapted to be positioned adjacent to the under surface of said steering wheel,
(d) means for adjusting the normal vertical position of said handle relative to said frame,
(e) brake and accelerator control means mounted on said frame including:
  (1) a clamp adapted to be removably secured to said brake pedal,
  (2) a clamp adapted to be removably secured to said accelerator pedal,
  (3) a rocker lever mounted intermediate its ends to said lower fulcrum,
  (4) a vertically adjustable brake linkage having a pivotal connection to said brake pedal clamp and said rocker lever at the other side of said lower fulcrum,
  (5) a vertically adjustable accelerator linkage having a pivotal connection to said accelerator pedal clamp and said rocker lever at the other side of said lower fulcrum, and
(f) means operatively connecting said operating lever to said rocker lever.

2. A manual control for operating the brake pedal and accelerator pedal of motor vehicles having a steering column comprising a fixed housing and a steering wheel rotatably mounted on the upper end of the housing, said control comprising:
  (a) a drive shaft having upper and lower ends,
  (b) means for mounting the drive shaft vertically on said vehicle along said fixed housing for oscillation about its axis,
  (c) a lever secured at one end to the upper end of said drive shaft for imparting said oscillation thereto and having a handle at its other end movable adjacent and generally parallel to the under side of said steering wheel whereby the operator's hand may rest on the steering wheel while moving the handle,
  (d) a lost motion linkage adapted to be connected to said brake pedal,
  (e) a lost motion linkage adapted to be connected to said accelerator pedal,
  (f) means including a rocker bar pivoted intermediate its ends for converting oscillations of said drive shaft in one direction into downward motion of said brake linkage and in the other direction into downward motion of said accelerator linkage.

3. A manual control for operating the brake pedal and accelerator pedal of motor vehicles having a steering column comprising a fixed housing and a steering wheel rotatably mounted on the upper end of said housing, said control comprising:
  (a) a drive shaft having upper and lower ends,
  (b) means for mounting the drive shaft vertically on said vehicle and along said fixed housing for oscillation about its axis,
  (c) a lever secured at one end to the upper end of said drive shaft for imparting said oscillation thereto and having a handle on its other end movable adjacent and generally parallel to the under side of said steering wheel whereby the operator's hand may rest on the steering wheel while moving the handle,
  (d) a bar pivoted intermediate its ends to said mounting means for oscillation about a horizontal axis,
  (e) means for translating the oscillations of said drive shaft into oscillations of said bar,
  (f) a lost motion linkage for said brake pedal connected to said bar at one side of said horizontal axis, and
  (g) a lost motion linkage connecting said accelerator pedal to said bar at the other side of said horizontal axis.

4. A manual control for operating the brake pedal and accelerator pedal of motor vehicles having a steering column comprising a fixed housing and a steering wheel rotatably mounted on the upper end of the housing, said control comprising:
  (a) a drive shaft having upper and lower ends,
  (b) means for mounting the drive shaft vertically on said vehicle and along said fixed housing for oscillation about its axis,
  (c) a lever secured at one end to the upper end of said drive shaft for imparting said oscillation thereto and having a handle on its other end movable adjacent and generally parallel to the under side of said steering wheel whereby the operator's hand may rest on the steering wheel while moving the handle,
  (d) means including a horizontal shaft operatively connected to the lower end of said drive shaft for translating the oscillations of the drive shaft into oscillations of said horizontal shaft about a horizontal axis,
  (e) means secured to said horizontal shaft including a lost motion linkage at one side of said horizontal shaft to operate the brake pedal and a lost motion linkage at the other side of said horizontal shaft to operate said accelerator pedal.

5. A manual control as set forth in claim 4 in which the means secured to said horizontal shaft includes a bar adapted to extend transversely of the motor vehicle over the brake pedal and accelerator pedal and said lost motion linkages have pivotal connection with said bar, said bar being mounted intermediate its ends on said horizontal shaft.

6. A manual control for operating the brake pedal and accelerator pedal of a motor vehicle having a dash board, a steering column comprising a housing fixedly secured to said dash board and a steering wheel rotatably mounted on said housing above the dash board, said control comprising:
  (a) a bar adapted to be mounted on said vehicle below said dash board intermediate its ends on a fulcrum generally parallel to the longitudinal axis of the vehicle so that the bar extends transversely of the vehicle and overlies the brake pedal and accelerator pedal,
  (b) a linkage operatively connected to said bar at one side of said fulcrum and adapted to be connected to said brake pedal,
  (c) a linkage operatively connected to said bar at the other side of said fulcrum adapted to be connected to said accelerator pedal,
  (d) and means including a lever adapted to be located adjacent to said steering wheel and a rod operatively connected to said lever and to said bar between said fulcrum and the connection of one of said linkages for selectively oscillating said bar to operate said brake and accelerator.

7. A manual control as set forth in claim 6 in which said lever is pivoted for oscillatory movement generally parallel and adjacent to the under surface of the steering wheel.

8. A manual control as set forth in claim 6 in which said lever is pivoted for movement toward said steering wheel to operate said accelerator and away from said steering wheel to operate said brake.

9. A manual control as set forth in claim 8 in which the rod connecting said lever to said bar is adjacent to said brake linkage, said brake linkage including a lost motion connection permitting said rod to raise the bar on its side of the fulcrum without lifting the brake pedal and when it is so raised to depress the accelerator pedal.

10. A manual control for operating the brake pedal and accelerator pedal of motor vehicles having a steering column comprising a fixed housing and a steering wheel rotatably mounted on the upper end of the housing, said control comprising:
  (a) a frame adapted to be removably mounted on said vehicle and along said housing,
  (b) a drive saft having upper and lower ends oscillatably mounted in upper and lower journals on said frame, (c) a lever secured at one end to the upper end of said drive shaft for imparting said oscillation thereto and having a handle on its other end movable adjacent and generally parallel to the under side of said steering wheel, (d) a bevel gear on the lower end of said drive shaft, (e) a driven shaft journaled on said frame at right angles to said drive shaft having a bevel gear in mesh with the bevel gear on said drive shaft whereby oscillations of the drive shaft about the vertical axis are translated into oscillations of said driven shaft about a horizontal axis, (f) means secured to said driven shaft including a lost motion linkage at one side of said driven shaft to operate the brake pedal and a lost motion linkage at the other side of said driven shaft to operate the accelerator pedal.

11. A manual control for operating the brake pedal and accelerator pedal of motor vehicles having a steering column comprising a fixed housing and a steering wheel rotatably mounted on the upper end of said housing, said control comprising:

(a) a frame adapted to be removably mounted on said vehicle and along said housing, (b) a drive shaft having upper and lower ends oscillatably mounted on said frame in upper and lower journals, (c) a lever adjustably secured at one end to the upper end of said drive shaft for imparting oscillation thereto about its axis from either the right side or the left side by a handle on its other end movable adjacent and generally parallel to the underside of said steering wheel, (d) a fulcrum on said frame at right angles to said drive shaft, (e) a bar mounted intermediate its ends on said fulcrum, (f) means operatively connecting said drive shaft to said bar for translating the oscillations of the drive shaft into oscillations of said bar, (g) means secured to said bar including a lost motion linkage at one side of said fulcrum to operate the brake pedal and a lost motion linkage at the other side of said fulcrum to operate said accelerator pedal.

12. A manual control for operating the brake pedal and accelerator pedal of motor vehicles having a steering column comprising a fixed housing and a steering wheel rotatably mounted on the upper end of the housing, said control comprising:

(a) a frame adapted to be removably secured on said vehicle and along said housing, (b) a lever having a pivotal connection at one end to said frame and a handle on its other end, said pivotal connection providing for movement of the handle end of said lever in two selected directions adjacent and substantially parallel to the under side of said steering wheel and for location of said handle end at either the left or right side of said wheel, (c) movable means mounted on the lower part of said frame including a link to operate the brake pedal and a link to operate the accelerator pedal, and (d) means operatively connecting said lever to said movable means for translating the movement of said lever in either selected direction at either side into downward movement of said brake link and in the other direction into downward movement of said accelerator link.

13. A manual control as set forth in claim 12 in which said movable means includes a bar pivoted adjacent to one of its ends to said brake link and adjacent to its other end to said accelerator link and said means operatively connecting said lever to said movable means includes a drive shaft adjustably connected to said lever at its upper end and having a bevel gear on its lower end, two stub shafts each having a bevel gear on one end thereof journaled in axial alignment on said frame with their bevel gears in mesh with the bevel gear on said drive shaft and adapted on their other ends to be secured to said bar.

14. A manual control as set forth in claim 12 in which said movable means is a bar pivoted intermediate its ends to said frame and said lever is operatively connected to said bar by means including a drive shaft removably and non-rotatably connected at its upper end to one end of said lever, a crank arm fixed to the lower end of said drive shaft, a guide rod secured to the lower end of said frame, a slider on said guide rod, a link connecting said slider to said crank arm whereby oscillation of said shaft imparts reciprocation to said slider, said bar having a pivotal connection to said brake link at one end and a pivotal connection at the other end to said accelerator link, and means connecting said slider to said bar to oscillate it about its intermediate pivot.

15. A manual control as set forth in claim 14 in which said means connecting said slider to said bar includes toggle links and a link connecting said slider to one of said toggle links.

16. A manual control as set forth in claim 14 in which said means connecting said slider to said bar includes a bell crank arm on said bar below the intermediate pivot and a link connecting said slider and the lower end of said bell crank arm.

References Cited

UNITED STATES PATENTS

| | | | |
|---|---|---|---|
| 1,551,696 | 9/1925 | Reynolds | 74—481 X |
| 2,185,024 | 12/1939 | Eddy | 74—544 X |
| 2,586,111 | 2/1952 | Maurice et al. | 192—3 |
| 2,658,411 | 11/1953 | Eversman | 74—562.5 |
| 2,724,285 | 11/1955 | Lerman | 74—484 X |
| 2,826,089 | 3/1958 | Hammack | 74—481 X |
| 2,899,835 | 8/1959 | Moreland | 192—3 X |
| 2,953,036 | 9/1960 | Wendt | 74—481 X |

FOREIGN PATENTS

| | | |
|---|---|---|
| 148,600 | 10/1952 | Australia. |
| 886,718 | 7/1943 | France. |

FRED C. MATTERN, Jr., *Primary Examiner.*

C. F. GREEN, *Assistant Examiner.*

Dedication 3,373,628.—*Louise Lake*, New York, N.Y. and *George H. Mortimer*, Montclair, N.J. HAND CONTROL FOR MOTOR VEHICLES. Patent dated Mar. 19, 1968. Dedication filed July 28, 1980, by the assignee, *Louise Lake Enterprises, Inc.*

Hereby dedicates to the Public the entire term of said patent.

[*Official Gazette October 28, 1980.*]